(12) United States Patent
Kuo et al.

(10) Patent No.: US 8,462,433 B2
(45) Date of Patent: Jun. 11, 2013

(54) MULTI-CHANNEL OPTICAL IMAGE FETCHING APPARATUS

(75) Inventors: Chih-Wei Kuo, Taichung (TW);
Chien-Yuan Han, New Taipei (TW);
Er-Liang Jian, Taoyuan County (TW);
Min-Fang Lo, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 63 days.

(21) Appl. No.: 13/304,750

(22) Filed: Nov. 28, 2011

(65) Prior Publication Data

US 2012/0154621 A1    Jun. 21, 2012

(30) Foreign Application Priority Data

Dec. 15, 2010  (TW) ................. 99143892 A

(51) Int. Cl.
| G02B 5/30 | (2006.01) |
| G02B 27/28 | (2006.01) |
| G02B 13/16 | (2006.01) |
| G02B 27/10 | (2006.01) |
| H04N 5/228 | (2006.01) |
| H04N 5/225 | (2006.01) |

(52) U.S. Cl.
USPC .............. 359/485.01; 359/485.06; 348/222.1; 348/335; 348/343; 348/344

(58) Field of Classification Search
USPC .. 349/56–103; 359/237–324, 483.01–494.01; 348/222.1, 239, 333.01–369
See application file for complete search history.

(56) References Cited

U.S. PATENT DOCUMENTS

| 6,594,583 | B2* | 7/2003 | Ogura et al. ................. 701/301 |
| 2003/0021519 | A1* | 1/2003 | Zalevsky et al. ............... 385/16 |
| 2004/0013343 | A1* | 1/2004 | Hoshikawa et al. ............ 385/16 |
| 2005/0057701 | A1* | 3/2005 | Weiss .............................. 349/10 |
| 2005/0089265 | A1* | 4/2005 | Ide .................................. 385/16 |
| 2005/0111072 | A1* | 5/2005 | Miyagaki et al. ............. 359/279 |
| 2005/0134776 | A1* | 6/2005 | Imai et al. ..................... 349/123 |
| 2005/0185139 | A1* | 8/2005 | Yamanaka et al. .............. 353/20 |
| 2005/0232570 | A1* | 10/2005 | Ide ................................ 385/140 |
| 2006/0268408 | A1* | 11/2006 | Toussaint et al. ............. 359/487 |
| 2009/0278954 | A1* | 11/2009 | Kanamori et al. ......... 348/222.1 |
| 2009/0290039 | A1* | 11/2009 | Kanamori et al. ......... 348/222.1 |
| 2010/0054753 | A1* | 3/2010 | Futami et al. ................. 398/152 |

* cited by examiner

*Primary Examiner* — Michael Osinski
(74) *Attorney, Agent, or Firm* — Jackson IPG PLLC

(57) ABSTRACT

The present invention provides an apparatus for fetching optical images. Images from multiple channels are obtained. A device is used to automatically switch the images. The switching is based on time-sharing multiplexing (TSM). Thus, the images are formed on another device. The images are then integrated and displayed to be used in an optical vehicle safety assistant system.

9 Claims, 7 Drawing Sheets

Figure 1:
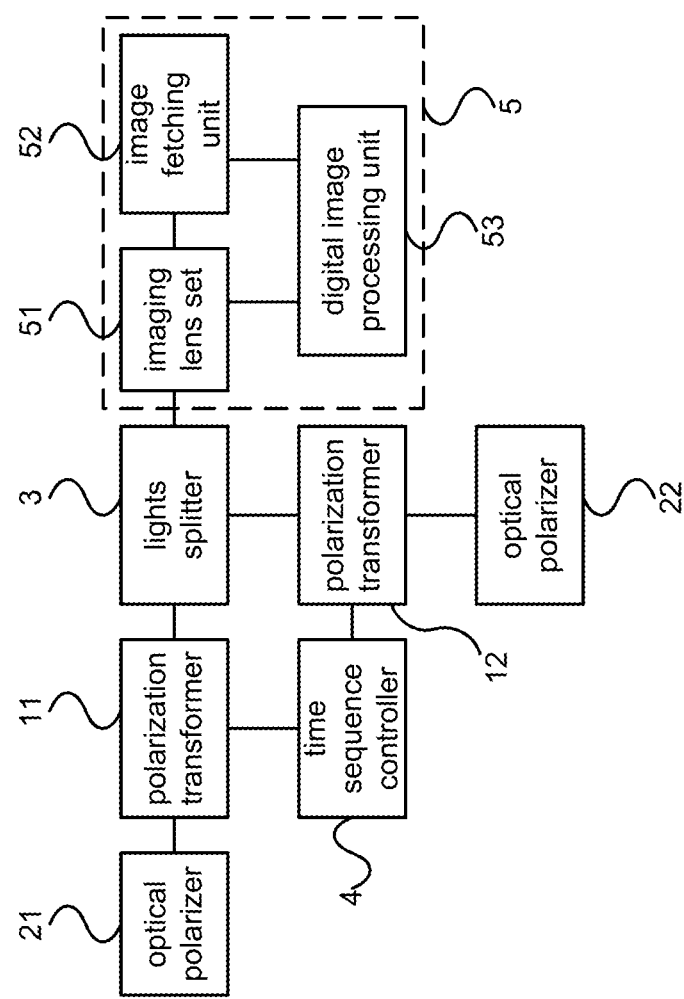
Figure 2:
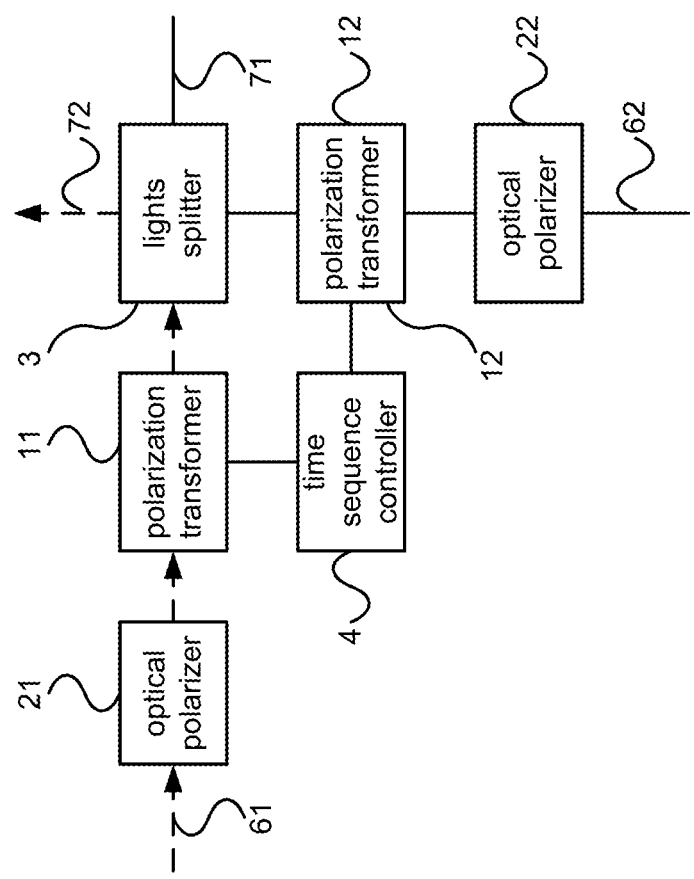
Figure 3:
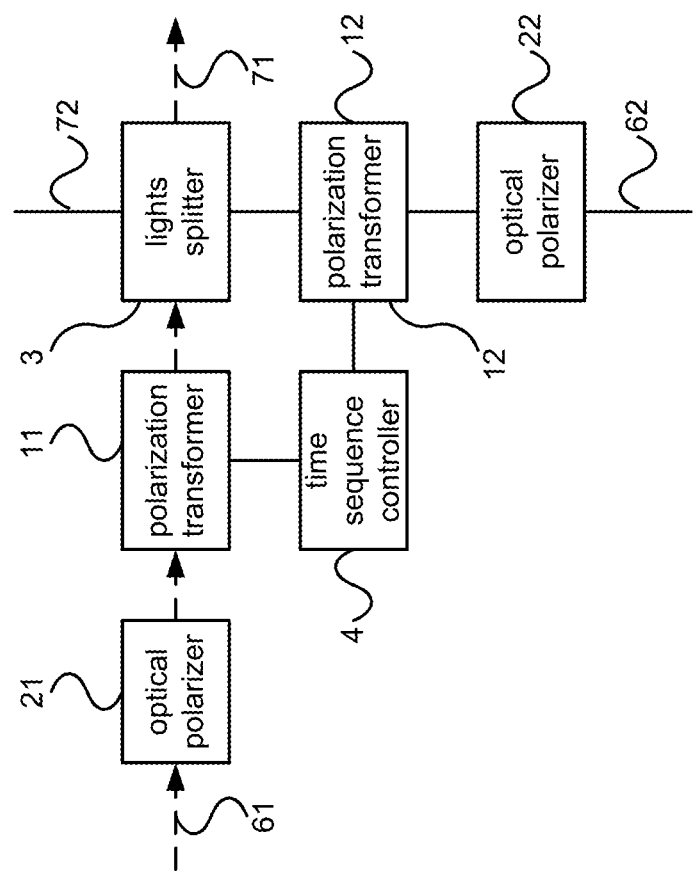

MULTI-CHANNEL OPTICAL IMAGE FETCHING APPARATUS

TECHNICAL FIELD OF THE INVENTION

The present invention relates to fetching image; more particularly, relates to a device switching images based on time-sharing multiplexing (TSM) used in an optical vehicle safety assistant system.

DESCRIPTION OF THE RELATED ARTS

According to shapes of vehicles, there may be various blind spots endangering drivers, especially in a complex environment like a narrow lane or a small garage. For solving blind spot problems, vehicle safety monitoring systems are provided. Generally, a camera is set for providing a back vision for a driver to back a vehicle. A common vehicle safety monitoring system has a 60° visual angle. But, such a design is not efficient enough, for the driver still have to further monitor front vision and visions from driving mirrors, not all visions around the vehicle at a glance. Hence, accidences may still happen.

A prior art of vehicle safety system comprises a detector, a camera, a recorder and a controller. The prior art uses the detector to detect objects around a vehicle to output signals to the controller. The controller measures distances to the objects to output controlling signals for activating the camera to process photography. Photographed images are further recorded by the recorder and are displayed by a monitor. Hence, objects getting close to the vehicle along roads on driving, like human, animals, etc., can be shown immediately. However, it does not monitor environment at all directions at the same time. U.S. Pat. No. 7,139,412 reveals another prior art. Several cameras are set on a vehicle to provide images of visions around. Then, the images are integrated into a whole image to be shown on a monitor. However, the images are not well seamed and some dislocations may appear at places between adjacent images, so that the driver is not provided with an accurate whole image. Another prior art comprises two cameras, an image processor and a display. One of the two cameras is set on a vehicle to obtain a first image of environment around the vehicle; and another one of the two cameras is set on the vehicle to obtain a second image of environment around the vehicle. The two images have an overlapping area. The image processor comprises a definition unit, a combination unit, a deformation unit, an image registration unit, a transforming unit and a displaying unit. Therein, the definition unit defines the first image and the second image into a plurality of first image dots and a plurality of second image dots; the combination unit integrates the first and the second images into a third image; the deformation unit spreads a result from the image registration unit into images to distort the first and the second images; the image registration unit aligns objects at seaming places of the first and the second images; the transforming unit transforms the first and the second images into top-down-view images; and, the displaying unit displays the third image. The first and the second images of the environment around the vehicle are integrated at a top-down view so that the overlapping area may look smooth and seamless to form a high-quality image for obtaining a good monitoring function. Because the first and the second images are defined into dots and transferred and then combined, distortion may happen and discontinuousness may appear at the seaming places between the images.

Another prior art comprises a camera module, a controlling module and a displaying module. The camera module has two motors to move lenses at different directions for omnibearing photography. But, this prior art has complex mechanism and optical structure. The image has some distortion and discontinuousness at the seaming places, too. Another prior art reveals a mechanical optical switch. An optical fiber module is used for switching by moving fibers mechanically. Its problem is that the time spent for switching is a little long. Sometimes, bouncing and bad repetition may even happen. Moreover, its size is too big to be easily used for making a big optical switch array. Another prior art uses a crystal chip to control polarization for switching. This prior art comprises two polarized lights splitter, a crystal and two reflective lenses. This prior art does not move optical components for switching optical paths. In addition, there are fewer components between input ends and output ends. However, although the components used in this prior art are precise, errors still exist.

Hence, the prior arts do not fulfill all users' requests on actual use.

SUMMARY OF THE INVENTION

The main purpose of the present invention is to provide an apparatus for fetching images with multiple channels to avoid image distortion, optical error, etc.

To achieve the above purpose, the present invention is a multi-channel optical image fetching apparatus, comprising a first and a second optical polarizers, an optical imaging lens set, a polarized lights splitter, a first and a second optical birefractive polarization transformers, a programmable time sequence controller and an image fetching unit, where the first optical polarizer processes horizontal polarization and is set at an opening of an optical channel; the second optical polarizer processes perpendicular polarization and is set at an opening of another optical channel; the optical imaging lens set processes optical transformation according to a scale of a visual angle; the polarized lights splitter is set at an end of the optical imaging lens set and is an optical logic switch to control output directions of a plurality of inlet lights; the optical birefractive polarization transformers are separately set between the polarized lights splitter and the first and the second optical polarizers; the optical birefractive polarization transformers process polar transformation to the inlet lights through controlling voltage; the programmable time sequence controller controls operational times of the optical birefractive polarization transformers according to time sequences to switch images obtained from the optical channels; the image fetching unit fetches images obtained from different visual angles to be formed on a sensing unit according to the time sequence; and the image fetching unit shows the images obtained from the different visual angles. Accordingly, a novel multi-channel optical image fetching apparatus is obtained.

BRIEF DESCRIPTIONS OF THE DRAWINGS

Figure 4:
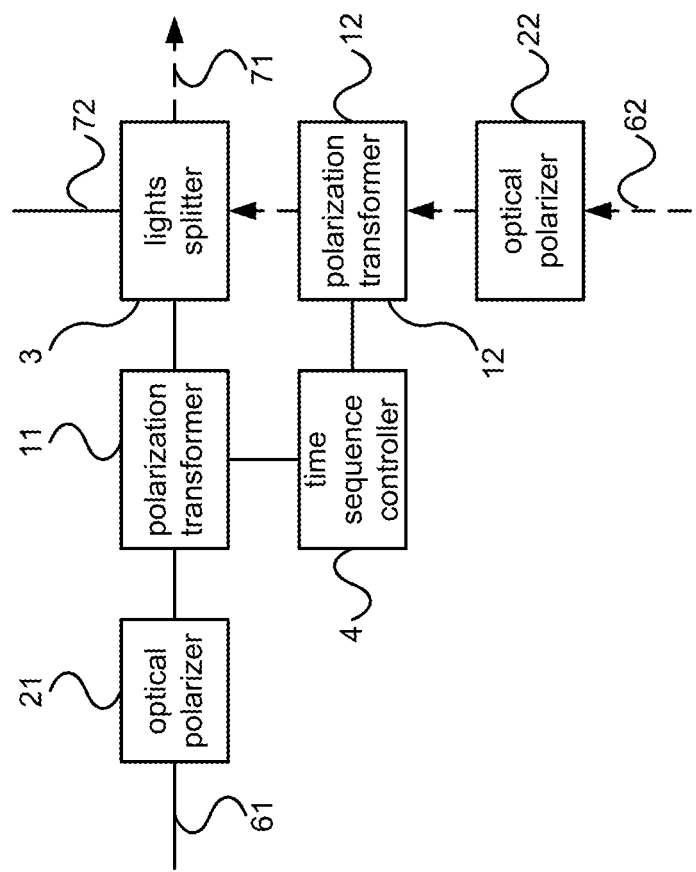
Figure 5:
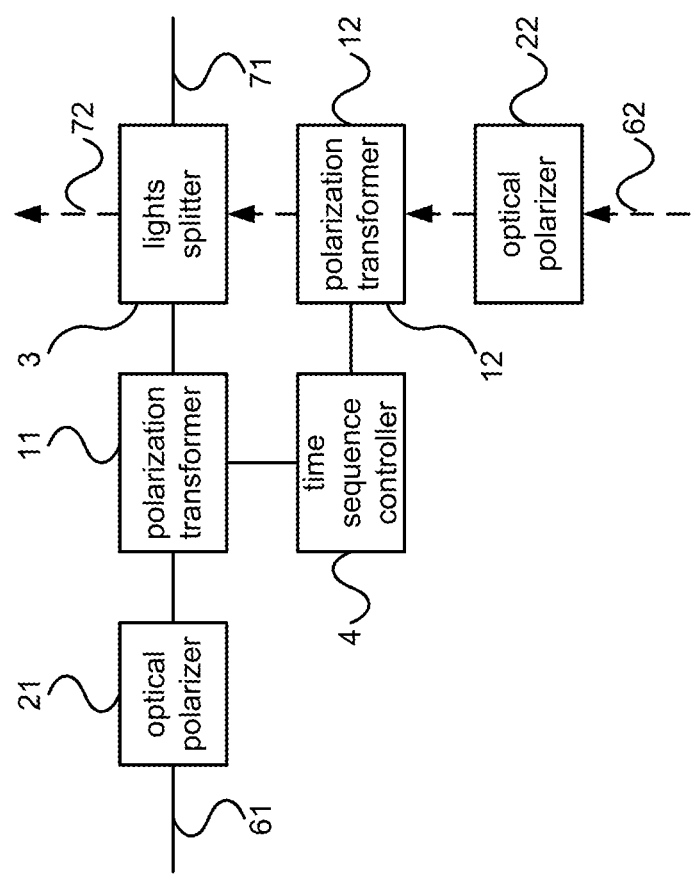
Figure 6:
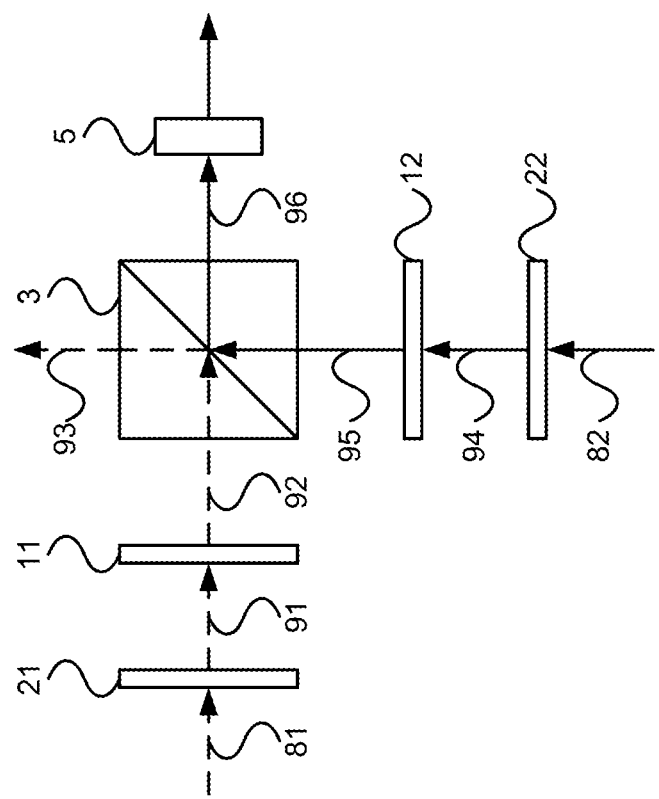
Figure 7:
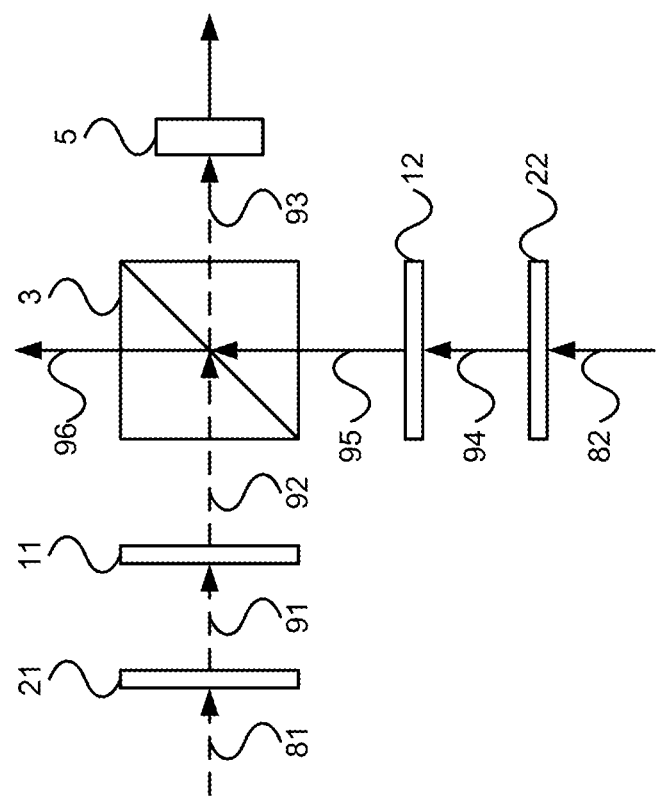

The present invention will be better understood from the following detailed description of the preferred embodiment according to the present invention, taken in conjunction with the accompanying drawings, in which FIG. 1 is the structural view showing the preferred embodiment according to the present invention;

FIG. 2 to FIG. 5 are the views showing the first to the fourth states of use; and FIG. 6 and FIG. 7 are the views showing the first and the second operational cycles.

DESCRIPTION OF THE PREFERRED EMBODIMENT

The following description of the preferred embodiment is provided to understand the features and the structures of the present invention.

Please refer to FIG. 1, which is a structural view showing a preferred embodiment according to the present invention. As shown in the figure, the present invention is a multi-channel optical image fetching apparatus, where optical images from different input ports are formed on a device and are automatically switched according to time sequence so that images obtained from different directions are automatically switched according to the time sequence to obtain good image integration in a vehicle safety assistant driving system for providing a wide and effective monitor coverage near a vehicle for a driver.

The multi-channel optical image fetching apparatus comprises a first and a second optical birefractive polarization transformers 11,12; a first and a second optical polarizer 21,22; a polarized lights splitter 3; a programmable time sequence controller 4; an optical imaging lens set 51; an image fetching unit 52; and a digital image processing unit 53.

The first optical polarizer 21 is provided for horizontal polarization, which is set at an opening of an optical channel; the second optical polarizer 22 is provided for perpendicular polarization, which is set at an opening of another optical channel; the optical imaging lens set 51 processes optical transformation according to a scale of a visual angle; the polarized lights splitter 3 is set in front of the optical imaging lens set 51 to be used as an optical logic switch for controlling output directions of a plurality of inlet lights; the optical birefractive polarization transformers 21,22 are separately set between the polarized lights splitter 3 and the first and the second optical polarizers 11,12 for processing polar transformation to the inlet lights through controlling voltage; the programmable time sequence controller 4 controls operational times of the optical birefractive polarization transformers 11,12 according to time sequence to switch images obtained from the optical channels; and, the image fetching unit 52 fetches images obtained from different visual angles to be formed on a sensing unit for showing the images according to the time sequence.

The optical polarizers 21,22 are used to change polarization directions of the inlet lights. After the inlet lights pass through the optical polarizers 21,22, the inlet lights are changed from natural lights into linear polarized lights. Therein, the first optical polarizer 21 changes the inlet lights into horizontal linear polarized lights; the second optical polarizer 22 changes the inlet lights into perpendicular linear polarized lights; and, the optical polarizers have various categories, such as polaroid.

The polarized lights splitter 3 splits the inlet lights by changing polarized states of the inlet lights after the inlet lights pass through the polarized lights splitter 3. That is, when the natural inlet lights are changed into linear polarized inlet lights through the optical polarizers 21,22, the polarized inlet lights are further switched by other optical devices to use their polarization directions to reflect them by or pass them through the polarized lights splitter 3 for thus controlling their traveling directions.

The optical birefractive polarization transformers 11,12 are separately set between the polarized lights splitter 3 and the first and the second optical polarizers 21,22, where the optical birefractive polarization transformers 11,12 process polar transformation to the inlet lights by controlling voltage. That is, after the inlet lights are transformed into linear polarized lights through the optical polarizers 21,22, the transformed linear polarized lights pass through the optical birefractive polarization transformers 11,12 without change or with polarizing directions turned for 90° according to polarization direction of the optical birefractive polarization transformers 11,12. Thus, output directions of the inlet lights and times for fetching images can be controlled. The polarization directions obtained by the optical birefractive polarization transformers 11,12 are controlled by the programmable time sequence controller 4, e.g. a voltage controller. The programmable time sequence controller 4 controls operational times of the optical birefractive polarization transformers 11,12 according to time sequence for switching images obtained from different optical channels.

The optical imaging lens set 51 processes optical transformation according to a scale of a visual angle for obtaining desired images.

The image fetching unit 52 comprises an image taking device, an image processing device and an image displaying device, where the image taking device comprises an array of sensing units, such as CCD devices or CMOS devices, with a design according to actual need. The inlet lights are sensed and fetched by the image taking device after travelling along the optical polarizers 21,22, the polarized lights splitter 3 and the optical imaging lens set 51. At the same time, as controlled by the programmable time sequence controller 4, the image taking device fetches images formed on the sensing unit according to time sequence and then the images are processed by the image processing device to be displayed on the image displaying device, e.g. an LCD monitor.

Please refer to FIG. 2 to FIG. 5, which are views showing a first to a fourth states of use. As shown in the figures, a non-specific polarized light (natural light) passes through a first optical polarizer 21 from a first input port 61 (a port of optical channel) to be transformed into an inlet light having a linear polarized state, i.e. a linear polarized light having a specific direction of electric field vibration. The direction of electric field vibration of the inlet light is determined by a first optical birefractive polarization transformer 11. When no voltage is applied to the first optical birefractive polarization transformer 11, the linear polarized light formed after passing through a first optical polarizer 21 has its direction of electric field vibration turned for 90° after entering into the first optical birefractive polarization transformer 11, which is a polarization direction for perpendicular inletting. Then, the linear polarized light is refracted after passing through the polarized lights splitter 3 and is outputted from the second output port 72.

When a voltage is applied to the first optical birefractive polarization transformer 11, the polarized inlet light from the first optical polarizer 21 is passed through the first optical birefractive polarization transformer 11 and the direction of its electric field vibration is not changed. Thus, the polarized inlet light is not refracted on passing through the polarized lights splitter 3 and is outputted through the first output port 71. In this way, the polarized inlet light from the first input port 61 can choose to be outputted through the first output port 71 or the second output port 72. In the same way, the polarized inlet light from the second input port 62 (another optical channel) can choose to be outputted through the first output port 71 or the second output port 72 (as shown in FIG. 4 and FIG. 5).

The first output port 71 is connected with an optical imaging lens set 51 and an image fetching unit 52; and, a programmable time sequence controller 4 is used to control times for applying voltage to the optical birefractive polarization transformers 11,12 at the first input port 61 and the second input port 62. When the inlet light from the first input port 61 is outputted from the first output port 71, the inlet light from the second input port 62 is outputted from the second output port 72. Or, when the inlet light from the first input port 61 is outputted from the second output port 72, the inlet light from the second input port 62 is outputted from the first output port 71. In this way, the different images from the first input port 61 and the second input port 62 are separately formed on the image fetching unit 52 according to time sequence; then, two images obtained at different time sequence are combined by a digital image processing unit 53 to be shown around a vehicle driver for providing views around a vehicle with wider visual angles and further providing high safety by getting rid of blind spots. The present invention can be used as an assistant device of verification of a vehicle safety warning system to record environment data inside and outside the vehicle, where real images taken along roads are used for verifying and measuring immediate relative speeds and relative positions between two moving vehicles.

The present invention controls the optical birefractive polarization transformers 11,12 through voltage to switch optical paths without moving or turning optical devices for enhancing system stability and durability and reducing system size and weight. Under a certain condition, the polarized lights splitter 3 can have a non-rectangle shape for requirements on monitoring different areas with inlet lights from different directions.

The key components of the present invention are the optical birefractive polarization transformers 11,12. For reducing size and cost of the present invention, it is preferred to use crystal devices for polar transformation. The present invention transfers the crystal device in a short time, where the crystal device has a fast responsible time, such as a twisted nematic liquid crystal device.

Please refer to FIG. 6 and FIG. 7 which are views showing a first and a second operational cycles. As shown in the figures, a first and a second optical birefractive polarization transformers 11,12 are crystal photo switches for changing polarizations of lights. The crystal photo switches 11,12 changes p-polarized lights into s-polarized lights and s-polarized lights into p-polarized lights when no voltage is applied; yet, polarization is remained when voltage is applied. Accordingly, in a first cycle, inlet lights pass through a first and a second optical polarizers 21,22 to be transformed into p-polarized lights and then pass through the crystal photo switches 11,12 with no voltage applied. At this moment, the p-polarized lights are transformed into s-polarized lights. After entering into a polarized lights splitter 3, the s-polarized lights are outputted from an s-polar terminal of the polarized lights splitter 3 (as shown in FIG. 6). In a contrary case, inlet lights pass through the first and the second optical polarizers 21,22 to be transformed into p-polarized lights and then pass through the crystal photo switches 11,12 with voltage applied. At this moment, the p-polarized lights keep the same polarization. After entering into the polarized lights splitter 3, the p-polarized lights are outputted from a p-polar terminal of the polarized lights splitter 3 (as shown in FIG. 7). Thus, the present invention uses crystal photo switches 11,12 controlled by circuits for switching between turning on and off and then images obtained during the process of switching are combined to form an image having a wide view.

In FIG. 6, in the first cycle, a first inlet light 81 (natural light) and a second inlet light 82 (natural light) enter into the first and the second optical polarizer 21,22 to become a first and a fourth linear polarized lights 91,94 having 0° azimuth; and, then, pass through the first and the second optical birefractive polarization transformers 11,12. Because the optical birefractive polarization transformers 11,12 will process polarization to light while no voltage is applied, outputted linear polarized lights 92,95 will have 90° azimuth before entering into the polarized lights splitter 3. Owing to the characteristic of the polarized lights splitter 3, p-polarized lights (0° azimuth) will be passed through and s-polarized lights (90° azimuth) will be refracted. Hence, the second and the fifth linear polarized lights 92,95 are transferred into a third and a sixth linear polarized lights 93,96 after refraction, where the refracted sixth linear polarized light 96 enters into an imaging unit 5 to form an image by the imaging unit 5.

In FIG. 7, in the second cycle, the first and the second inlet lights 81,82 enter into the first and the second optical polarizer 21,22 to become a first and a fourth linear polarized lights 91,94 having 0° azimuth; and, then, pass through the first and the second optical birefractive polarization transformers 11,12. Because the optical birefractive polarization transformers 11,12 will not process polarization to light while a voltage is applied, outputted linear polarized lights 92,95 will keep 0° azimuth before entering into the polarized lights splitter 3. Owing to the characteristic of the polarized lights splitter 3, p-polarized lights (0° azimuth) will be passed through and s-polarized lights (90° azimuth) will be refracted. Hence, the second and the fifth linear polarized lights 92,95 are transferred into a third and a sixth linear polarized lights 93,96 after passing through the polarized lights splitter 3, where the passed-through sixth linear polarized light 96 enters into the imaging unit 5 to form an image through the imaging unit 5.

To sum up, the present invention is a multi-channel optical image fetching apparatus, where polarized lights switches are used for switching images obtained from input ports at different angles; the images from different angles are formed on an image device to be switched according to time sequence automatically; and, thus, good image integration is obtained in a vehicle safety assistant driving system for providing a wide and effective monitor coverage near a vehicle for a driver.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A multi-channel optical image fetching apparatus, comprising
a first optical polarizer, said first optical polarizer processing horizontal polarization, said first optical polarizer being located at an opening of an optical channel;
a second optical polarizer, said second optical polarizer processing perpendicular polarization, said second optical polarizer being located at an opening of another optical channel;
an optical imaging lens set, said optical imaging lens set processing optical transformation according to a scale of a visual angle;
a polarized lights splitter, said polarized lights splitter being located at an end of said optical imaging lens set, said polarized lights splitter being an optical logic switch to control output directions of a plurality of inlet lights;

at least two optical birefractive polarization transformers, said optical birefractive polarization transformers being separately located between said polarized lights splitter and said first and said second optical polarizers, said optical birefractive polarization transformers processing polar transformation to said inlet lights through controlling voltage;

a programmable time sequence controller, said programmable time sequence controller controlling operational times of said optical birefractive polarization transformers according to time sequence to switch images obtained from said optical channels; and an image fetching unit, said image fetching unit fetching images obtained from different visual angles to be formed on a sensing unit according to time sequence, said image fetching unit showing said images obtained from said different visual angles.

2. The apparatus according to claim 1,
wherein said first optical polarizer processes horizontal polarization to transform said inlet light into a horizontal linear polarized light.

3. The apparatus according to claim 1,
wherein said second optical polarizer processes perpendicular polarization to transform said inlet light into a perpendicular linear polarized light.

4. The apparatus according to claim 1,
wherein said optical birefractive polarization transformer is a crystal device.

5. The apparatus according to claim 1,
wherein said optical birefractive polarization transformer switches images automatically by controlling time sequence with voltage.

6. The apparatus according to claim 5,
wherein said optical birefractive polarization transformer has a voltage controller.

7. The apparatus according to claim 1,
wherein said polarized lights splitter splits said inlet lights by changing polarized states of said inlet lights.

8. The apparatus according to claim 1,
wherein said image fetching unit comprises an image taking device, an image processing device and an image displaying device.

9. The apparatus according to claim 1,
wherein said image fetching unit has an array of sensing units.

* * * * *